(12) United States Patent
Miller et al.

(10) Patent No.: US 9,003,030 B2
(45) Date of Patent: Apr. 7, 2015

(54) DETECTING RELATIVE CROWD DENSITY VIA CLIENT DEVICES

(71) Applicant: International Business Machines Corporation, Armonk, NY (US)

(72) Inventors: Grant D. Miller, Arvada, CO (US); Scott W. Pollyea, Loveland, CO (US); Hamza Yaswi, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/733,234

(22) Filed: Jan. 3, 2013

(65) Prior Publication Data

US 2014/0189096 A1 Jul. 3, 2014

(51) Int. Cl.
| | |
|---|---|
| G06F 15/173 | (2006.01) |
| G06F 11/30 | (2006.01) |
| G01C 21/34 | (2006.01) |
| H04N 7/18 | (2006.01) |
| G01C 21/20 | (2006.01) |
| H04W 4/02 | (2009.01) |

(52) U.S. Cl.
CPC ........ *G06F 11/3048* (2013.01); *G01C 21/3438* (2013.01); *H04N 7/18* (2013.01); *G01C 21/20* (2013.01); *H04W 4/022* (2013.01)

(58) Field of Classification Search
None
See application file for complete search history.

(56) References Cited

U.S. PATENT DOCUMENTS

| | | | |
|---|---|---|---|
| 5,138,638 A * | 8/1992 | Frey ................................ 377/6 |
| 7,734,507 B2 | 6/2010 | Ritter |
| 7,797,204 B2 | 9/2010 | Balent |
| 2002/0167408 A1* | 11/2002 | Trajkovic et al. .......... 340/573.1 |
| 2003/0158796 A1 | 8/2003 | Balent |
| 2004/0093274 A1 | 5/2004 | Vanska et al. |
| 2006/0079247 A1 | 4/2006 | Ritter |
| 2008/0154720 A1 | 6/2008 | Gounares et al. |
| 2009/0157472 A1 | 6/2009 | Burazin et al. |
| 2010/0026802 A1* | 2/2010 | Titus et al. ..................... 348/143 |
| 2010/0030624 A1 | 2/2010 | Vanska et al. |
| 2013/0282520 A1* | 10/2013 | Tapley et al. ................. 705/26.8 |
| 2014/0067455 A1* | 3/2014 | Zhang et al. ................. 705/7.24 |
| 2014/0184795 A1 | 7/2014 | Miller et al. |

* cited by examiner

*Primary Examiner* — Nicholas Taylor
*Assistant Examiner* — Clayton R Williams
(74) *Attorney, Agent, or Firm* — Yee & Associates, P.C.; Jeff Tang

(57) ABSTRACT

Detecting crowds is provided. A location is selected in a set of locations a user of a client device wants to go to based on data within a profile associated with the user. A set of data inputs is monitored to determine a number of people currently at the selected location. Then, in response to determining that the number of people currently at the selected location is not greater than a user-defined threshold level of people for the selected location, a mapped route to the selected location is sent to the client device of the user.

10 Claims, 11 Drawing Sheets

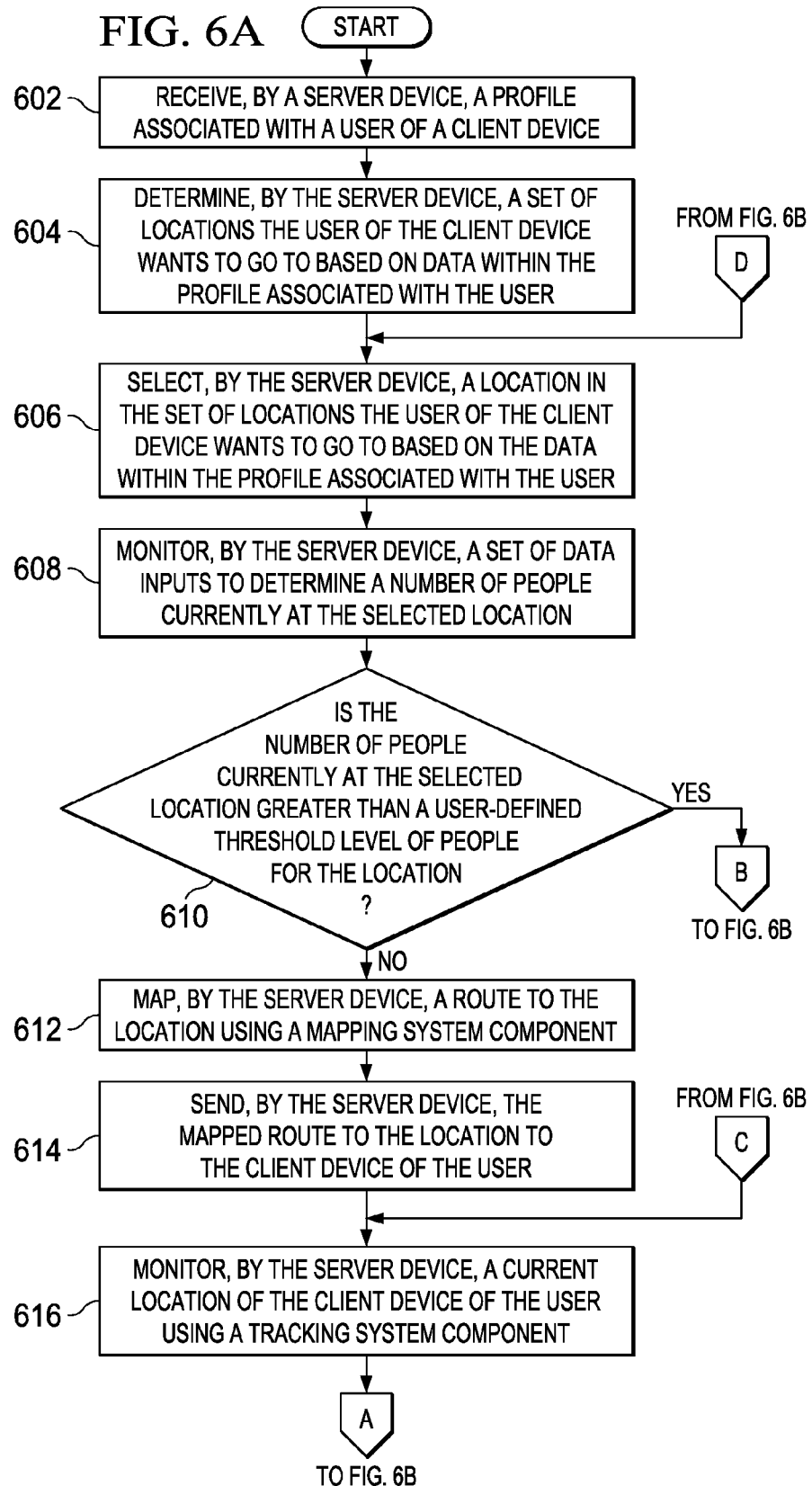

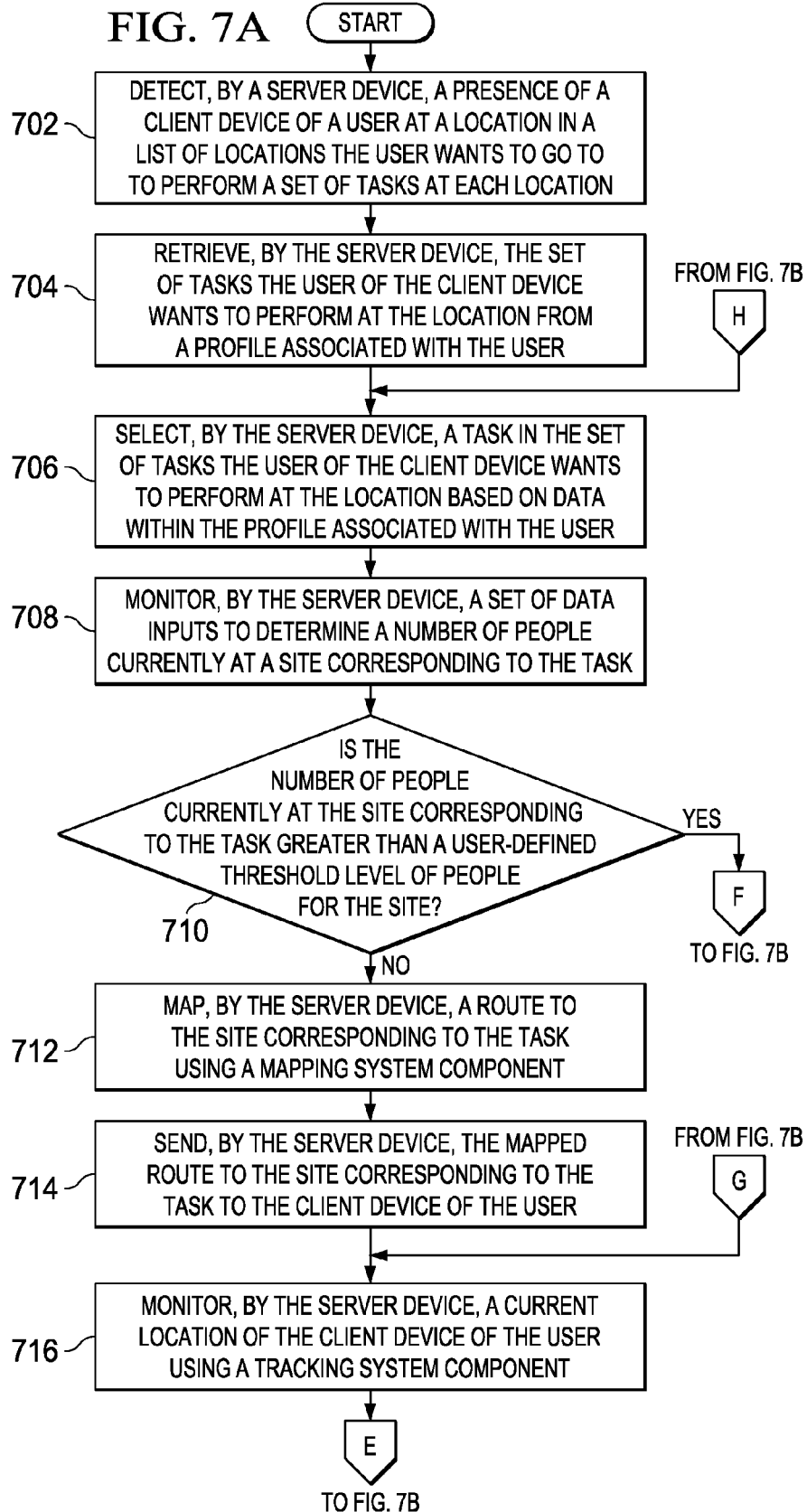

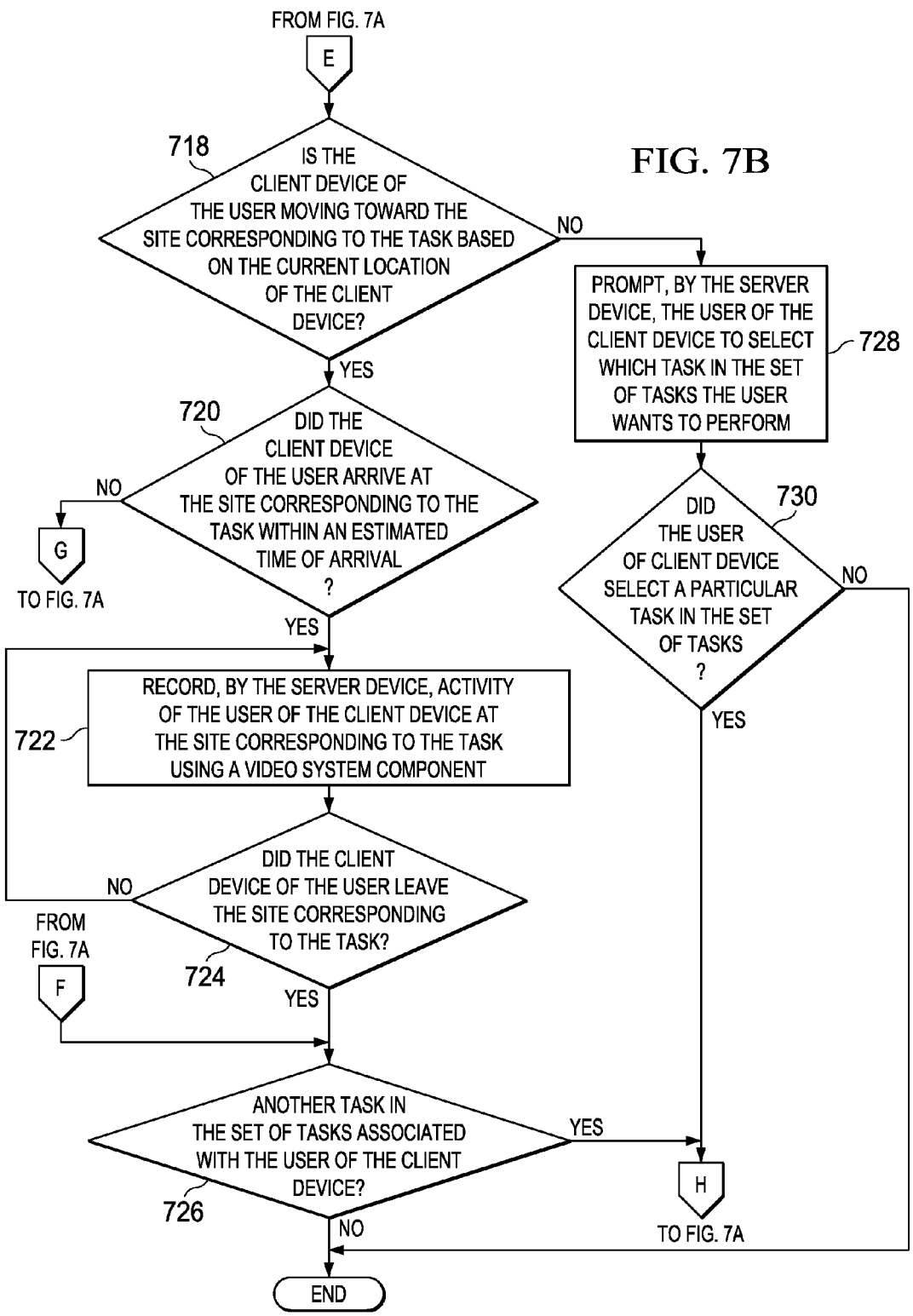

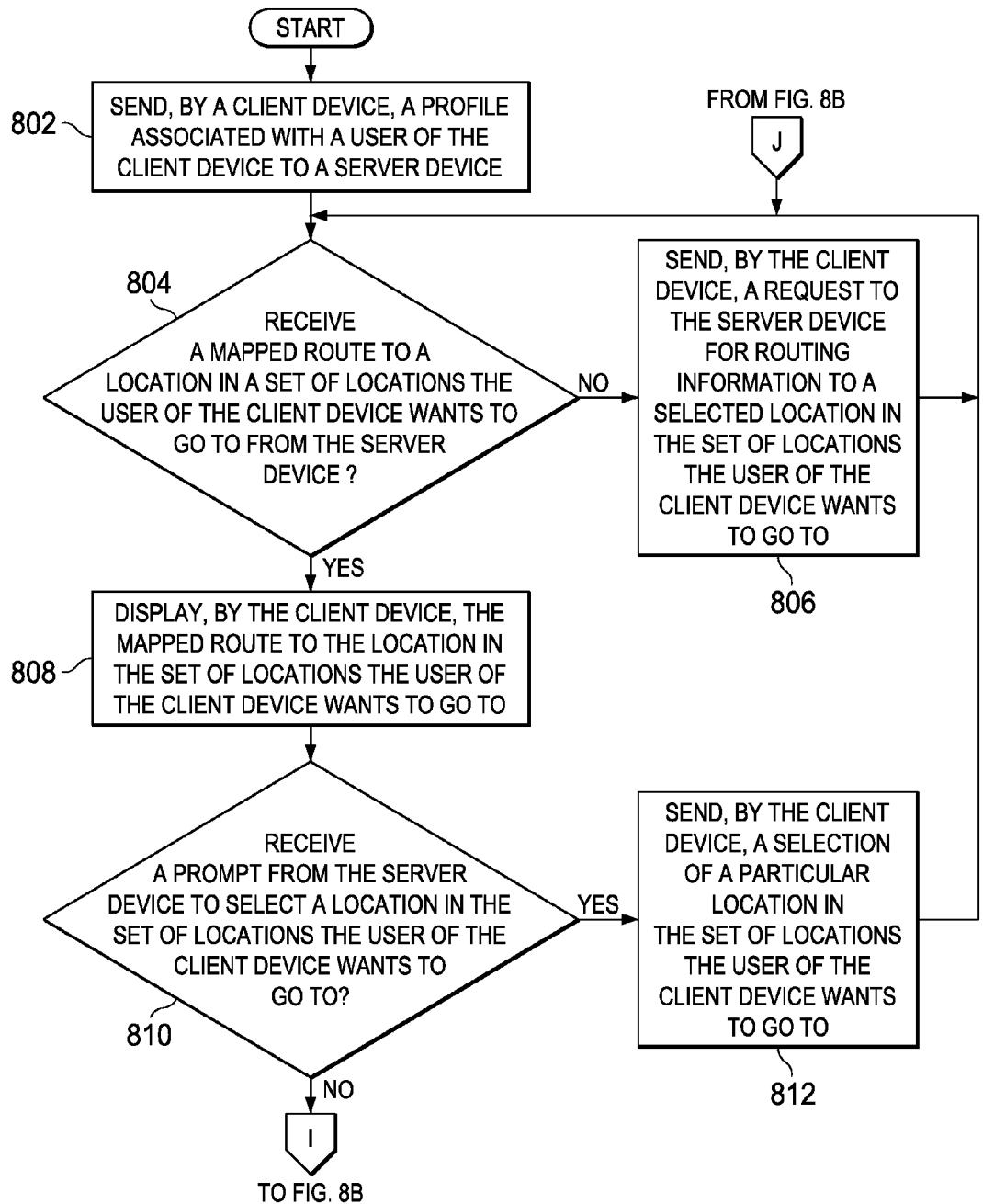

DETECTING RELATIVE CROWD DENSITY VIA CLIENT DEVICES

BACKGROUND

1. Field

The disclosure relates generally to crowd detection and more specifically to managing movements of a client device user based on a plurality of different data inputs.

2. Description of the Related Art

In today's busy world, people want to be able to conduct their daily shopping, such as grocery shopping, quickly and easily. Similarly, stores want to provide their customers with a pleasant shopping experience, which includes increasing the speed at which the customers can complete their shopping. However, many shoppers dislike dealing with crowded stores. For example, it may be an inconvenience for a shopper to maneuver around other shoppers in a crowded store and a crowded store may represent longer lines during the shopping experience. At a crowded grocery store this may mean longer lines at, for example, the bakery, meat counter, deli, and check out station, which increases a shopper's time spent at the grocery store and decreases the shopper's overall experience.

SUMMARY

According to one illustrative embodiment, a method for detecting crowds is provided. A computer selects a location in a set of locations a user of a client device wants to go to based on data within a profile associated with the user. The computer monitors a set of data inputs to determine a number of people currently at the selected location. Then, in response to the computer determining that the number of people currently at the selected location is not greater than a user-defined threshold level of people for the selected location, the computer sends a mapped route to the selected location to the client device of the user. According to other illustrative embodiments, a computer system and a computer program product for detecting crowds are provided.

BRIEF DESCRIPTION OF THE SEVERAL VIEWS OF THE DRAWINGS

FIG. 6A and FIG. 6B are a flowchart illustrating a process for detecting a crowd at a location in accordance with an illustrative embodiment;

FIG. 7A and FIG. 7B are a flowchart illustrating a process for detecting a crowd at a site corresponding to a task at a location in accordance with an illustrative embodiment; and FIG. 8A and FIG. 8B are a flowchart illustrating a process for a client device in accordance with an illustrative embodiment.

DETAILED DESCRIPTION

Figure 1:
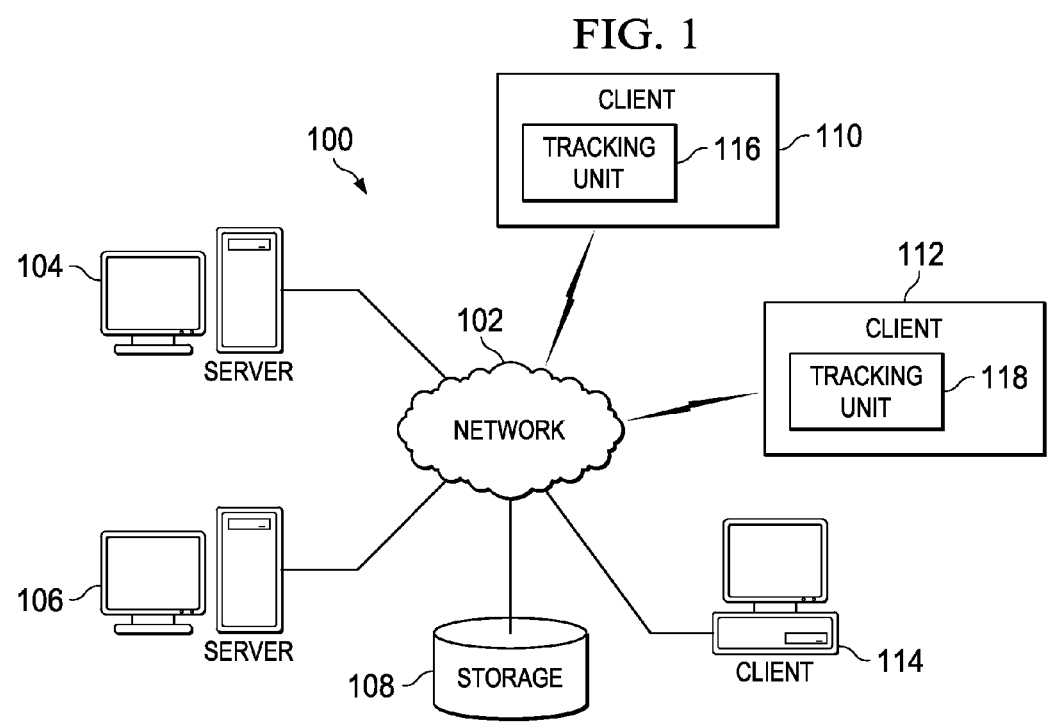
FIG. 1 is a pictorial representation of a network of data processing systems in which illustrative embodiments may be implemented.

As will be appreciated by one skilled in the art, aspects of the illustrative embodiments may be embodied as a computer system, computer implemented method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
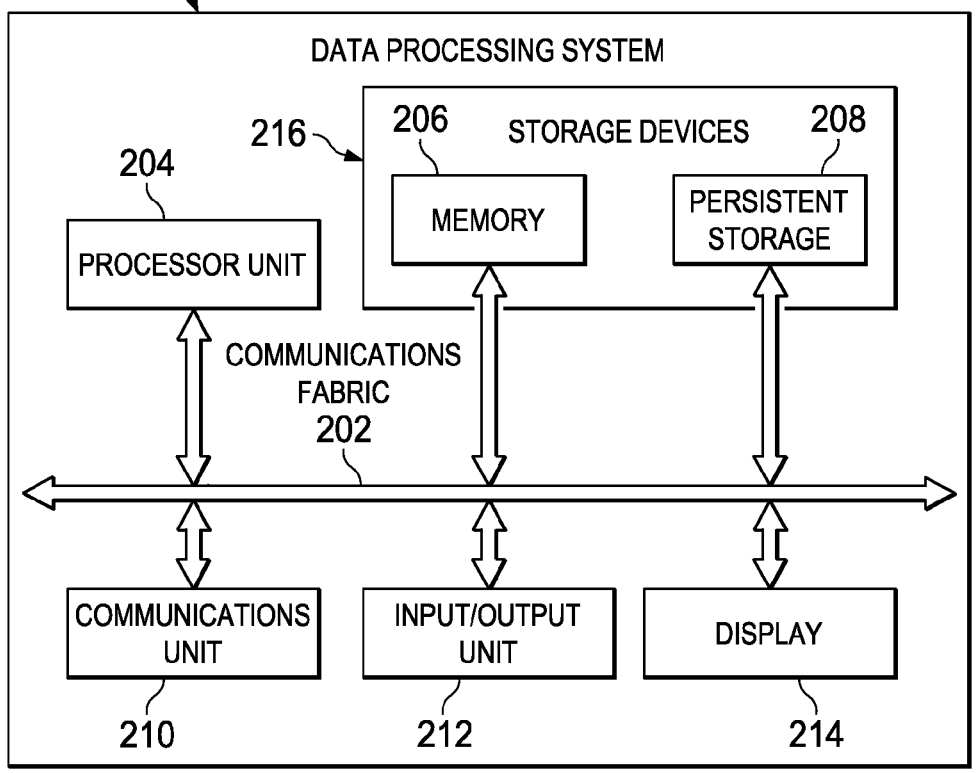
FIG. 2 is a diagram of a data processing system in which illustrative embodiments may be implemented.
Figure 3:
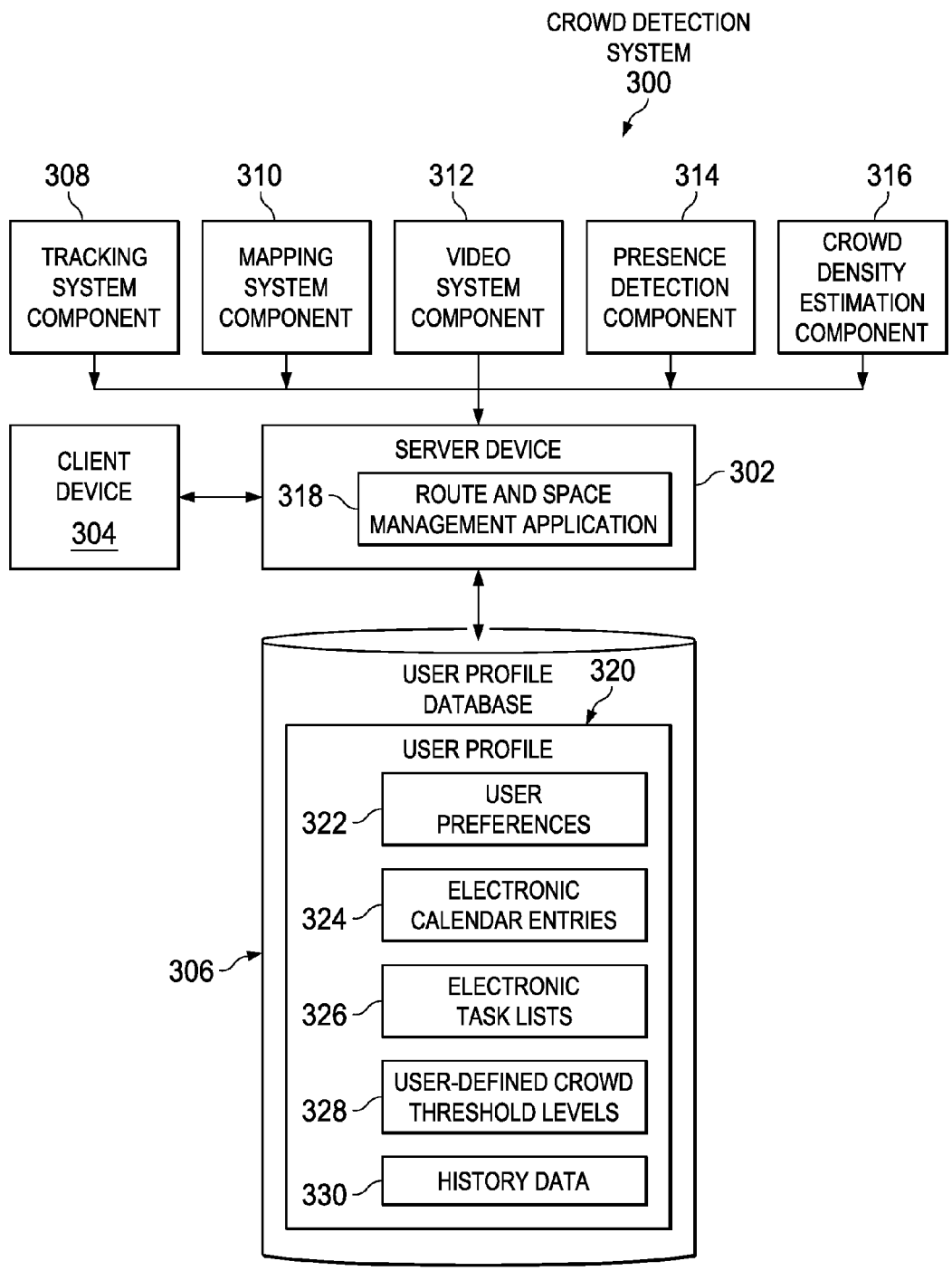
FIG. 3 is a diagram illustrating an example of a crowd detection system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables.

In the depicted example, server 104 and server 106 connect to network 102, along with storage unit 108. Server 104 and server 106 may be, for example, server computers with high speed connections to network 102. In addition, server 104 and/or server 106 may provide services for detecting crowds of people at different locations and managing movements of users of client devices connected to network 102 based on a plurality of different data inputs corresponding to those locations.

Clients 110, 112, and 114 also connect to network 102. Clients 110, 112, and 114 are clients to server 104 and/or server 106. In the depicted example, server 104 and/or server 106 may provide information, such as boot files, operating system images, and applications to clients 110, 112, and 114.

Clients 110 and 112 may be, for example, mobile data processing systems, such as cellular telephones, smart phones, personal digital assistants, gaming devices, or handheld computers, with wireless communication links to network 102. Also, clients 110 and 112 may include a tracking unit, such as tracking units 116 and 118. Client 114 may be, for example, a personal computer, a network computer, or a portable computer, such as a laptop computer.

Tracking units 116 and 118 may include, for example, global positioning system (GPS) transceivers and/or radio frequency identification (RFID) tags. Tracking units 116 and 118 provide current location data corresponding to clients 110 and 112. Clients 110 and 112 may send the location data corresponding to the current location of clients 110 and 112 to server 104 and/or server 106 on a continuous basis, on a predetermined time interval basis, or on demand.

Moreover, clients 110, 112, and 114 may send other data, such as, for example, user profile data associated with users of clients 110, 112, and 114 to server 104 and/or server 106. The user profile data may include, for example, preferences, electronic calendar entries, electronic task lists, user-defined crowd threshold levels, and history data corresponding to the users. Of course, the user profile data may include any information associated with a user of a client device. Server 104 and/or server 106 may utilize the user profile data to route users of the client devices to locations the users want to go to and to sites within those locations to perform different tasks.

Storage unit 108 is a network storage device capable of storing data in a structured or unstructured format. Storage unit 108 may provide, for example, storage of names and identification numbers of a plurality of users, user profiles corresponding to the plurality of users, user history data, video data corresponding to user activities at different locations, and network addresses, such as uniform resource locators (URLs), of social media web sites associated with each user in the plurality of users. Furthermore, storage unit 108 may store other data, such as security information that may include user names, passwords, and/or biometric data associated with system administrators and other users of the crowd detection and routing service.

Moreover, it should be noted that network data processing system 100 may include any number of additional server devices, client devices, and other devices not shown. Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer or other type of data processing system, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a non-statutory propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in this example, provides for communication with other data processing systems or devices. Communications unit 210 may provide communications through the use of either or both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user. In addition, display 214 may include touch screen capabilities to receive inputs from a user.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 218 is located in a functional form on computer readable media 220 that is selectively removable and may be loaded onto or transferred to data processing system 200 for running by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 224 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that people dealing with the problem of crowded stores will drive by a store to identify how many cars are in the parking lot. Or, people will just avoid certain days of the week or avoid certain hours of the day when they know there will be crowds of shoppers. However, this may be an inconvenience to these people and may not be based on current information.

Thus, illustrative embodiments provide users with real time data regarding how crowded a store is currently or how crowded a store may be at a future time based on historical data. Illustrative embodiments may utilize video surveillance, presence detection, and crowd density estimation to determine the number of people that are congregated in any given area. A user may utilize this crowd detection information to determine whether to make a trip to a particular store or to determine which particular aisle to go to in a store to help optimize the shopper's time.

Consequently, illustrative embodiments allow users to avoid crowded locations, optimize their time, and have a more pleasant experience as a result of having less stress due to decreased crowd exposure. Further, by users avoiding crowded stores, retail establishments may receive a benefit from having a more even flow of shoppers. An even flow of shoppers may enable a retail establishment to operate more efficiently, avoid stock outs, and provide a more relaxed environment for their shoppers.

Illustrative embodiments take into account shopping list or task list data of users, as well as other data, such as crowd density estimation at a location, presence detection, preferences corresponding to a particular user and other shoppers at a location, and real time location data corresponding to the user and the other shoppers at the location. Furthermore, illustrative embodiments take into account information obtained from a number of other sources, such as, for example, video surveillance cameras, motion detectors, radio frequency identification readers, and social media web sites.

Illustrative embodiments utilize all of this gathered information on a continuous basis to calculate, for example, the most efficient route to navigate to and through a store or other location. It should be noted that illustrative embodiments may continuously update a route to help ensure that illustrative embodiments provide a user with the best route possible based on user preferences and crowd detection. User preferences may include, for example, the fastest route through a store, most relaxed environment, routing to new products, routing to free samples, et cetera.

Illustrative embodiments also may calculate the best time to go to a store on a given day or week based on the user preferences and real time data. In addition, illustrative embodiments may calculate how many checkout personnel are needed to satisfy current and future demand based on real time data of shoppers moving through a store. For example, by illustrative embodiments knowing the routes of different shoppers through a store, illustrative embodiments may calculate when these different shoppers may arrive at checkout stations. Further, illustrative embodiments may route different shoppers to different checkout stations with minimum queue sizes to ensure a better checkout experience. Hence, retail establishments also may benefit from illustrative embodiments providing this service to their customers.

Thus, illustrative embodiments provide a method, computer system, and computer program product for detecting crowds. A computer selects a location in a set of locations a user of a client device wants to go to based on data, such as an electronic task list, within a profile associated with the user. The computer monitors a set of data inputs to determine a number of people currently at the selected location. Then, in response to the computer determining that the number of people currently at the selected location is not greater than a user-defined threshold level of people for the selected location, the computer sends a mapped route to the selected location to the client device of the user. The mapped route may be based on, for example, a selected task within the electronic task list and an estimated time to navigate to the selected task and an estimated time to complete the selected task. Moreover, the mapped route may be based on an estimated crowd density and a determined impact the estimated crowd density has on the mapped route.

With reference now to FIG. 3, a diagram illustrating an example of a crowd detection system is depicted in accordance with an illustrative embodiment. Crowd detection system 300 may be implemented in, for example, a network of data processing systems, such as network data processing system 100 in FIG. 1. Crowd detection system 300 includes server device 302, client device 304, user profile database 306, tracking system component 308, mapping system component 310, video system component 312, presence detection component 314, and crowd density estimation component 316. However, it should be noted crowd detection system 300 is only intended as an example and not intended as a limitation on illustrative embodiments. For example, crowd detection system 300 may include more or fewer devices and components than shown.

Server device 302 and client device 304 may be, for example, server 104 and client 110 in FIG. 1. Server device 302 includes route and space management application 318. Route and space management application 318 is a software program that is capable of determining the number of people at a location and managing movements of client device users at that location based on a plurality of different data inputs from a plurality of different sources, such as user profile database 306, tracking system component 308, mapping system component 310, video system component 312, presence detection component 314, and crowd density estimation component 316.

User profile database 306 stores a plurality of user profiles, such as user profile 320, which corresponds to a plurality of different users of crowd detection system 300. User profile 320 is the profile of the user associated with client device 304 and includes user preferences 322, electronic calendar entries 324, electronic task lists 326, user-defined crowd threshold levels 328, and history data 330. However, it should be noted that user profile 320 may include any information corresponding to the user of client device 304.

User preferences 322 include preferences of the user of client device 304, such as preferred order of locations the user wants to go to, preferred travel routes to the locations, preferred travel routes within the locations, preferred products to obtain at the locations, et cetera. Electronic calendar entries 324 are entries in an electronic calendar associated with the user of client device 304 and may contain information, such as times and locations of events the user wants to go to. Electronic task lists 326 are a set of one or more lists of tasks the user of client device 304 wants to perform at a set of one or more locations. Electronic task lists 326 may include, for example, a set of one or more shopping lists of products the user of client device 304 wants to purchase at a set of one or more known locations. In addition, electronic task lists 326 may include, for example, a set of one or more activities the user of client device 304 wants to do at an amusement park.

User-defined crowd threshold levels 328 are threshold numbers of people defined by the user of client device 304. Route and space management application 318 may utilize user-defined crowd threshold levels 328 to determine whether to route the user of client device 304 to a particular location or to a particular site within that location if the current number of people is greater than the user-defined threshold level for that location or site within that location. However, if user-defined crowd threshold levels 328 are not available, route and space management application 318 may utilize default crowd threshold levels. History data 330 is information associated with the user of client device 304, such as past purchase history of the user, previous routes to and through a location taken by the user, video recordings of the user in the location, et cetera. In addition, history data 330 may include a record of locations, along with dates and times, where the user traveled to to complete tasks within electronic task lists 326. Further, history data 330 may include determined behavior patterns of the user at the locations and determined behavior patterns of other people at those locations.

Route and space management application 318 may utilize tracking system component 308 to track a current position of client device 304. Tracking system component 308 includes a plurality of hardware and software components necessary to track client device 304. Tracking system component 308 may include, for example, global positioning system technology, radio frequency identification technology, or any other technology capable of tracking the current position of client device 304.

Route and space management application 318 may utilize mapping system component 310 to map routes to and through different locations for the user of client device 304 to follow. Mapping system component 310 may include, for example, city maps, maps of store layouts, and any other type of maps needed to route the user of client device 304. Route and space management application 318 may utilize video system component 312 to detect the user of client device 304 using, for example, facial recognition technology. Also, route and space management application 318 may utilize video system component 312 to detect the presence and the number of other people at a location. Video system component 312 is a network of video surveillance cameras at the location. In addition, route and space management application 318 may utilize video system component 312 to determine historical congestion points and patterns at a location and then monitor those congestion points at an increased frequency. Further, route and space management application 318 may monitor crowd densities at those congestion points on a predetermined time interval basis, such as, for example, every minute, and reroute the user of client device 304 based on the monitored crowd densities at those congestion points.

Route and space management application 318 may utilize presence detection component 314 to detect the presence of people at a location. Presence detection component 314 may include, for example, motion sensor technology. Route and space management application 318 may utilize crowd density estimation component 316 to estimate the number of people currently at a location or estimate the number of people that may be at the location at a future time. Crowd density estimation component 316 may utilize data obtained by tracking system component 308, video system component 312, and presence detection component 314 to estimate a current crowd density at a location and/or a future crowd density based on determined historical crowd density patterns.

Figure 4:
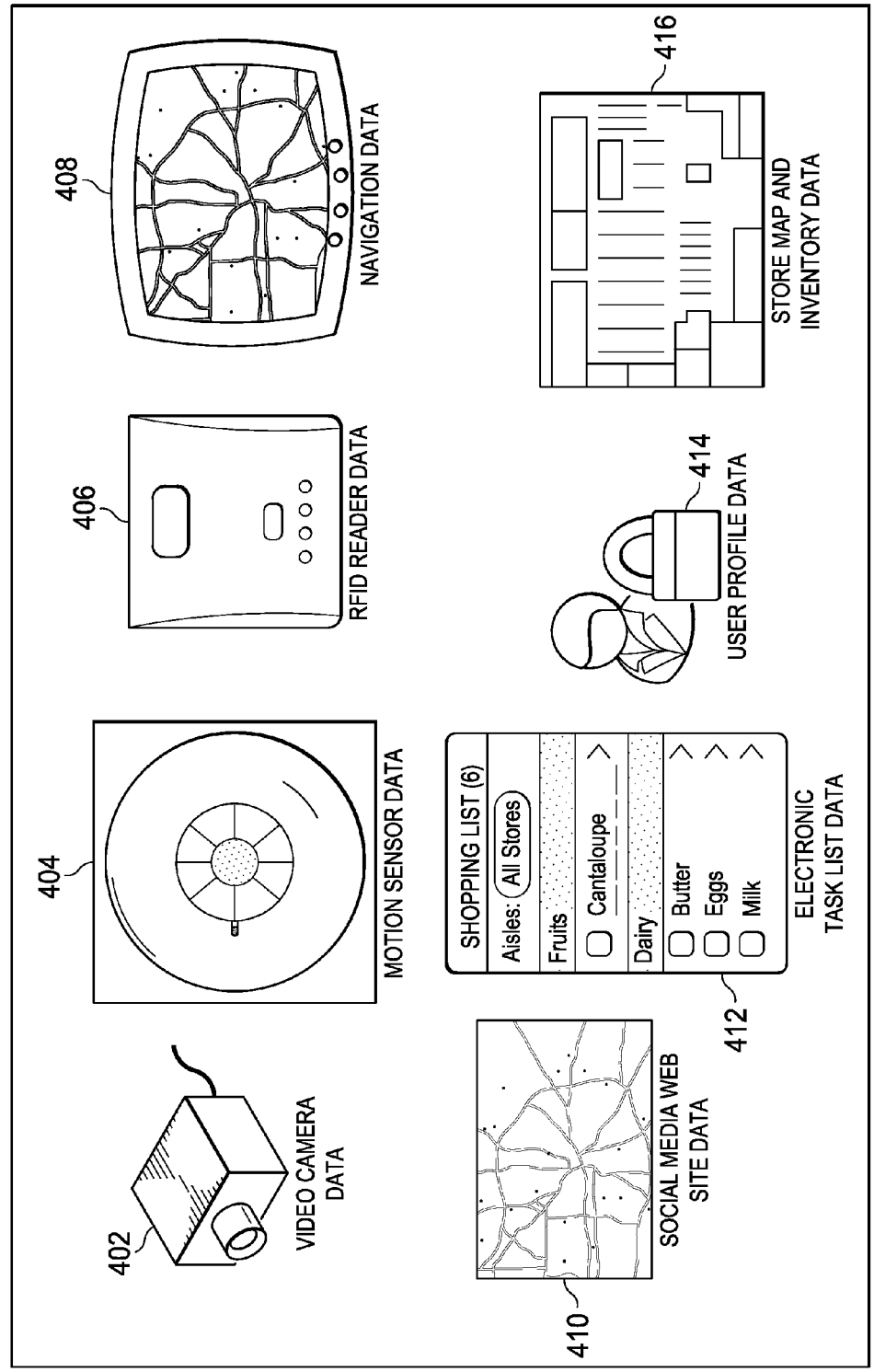
FIG. 4 is a diagram illustrating an example of a plurality of different data inputs in accordance with an illustrative embodiment.

With reference now to FIG. 4, a diagram illustrating an example of a plurality of different data inputs is depicted in accordance with an illustrative embodiment. A crowd detection system, such as crowd detection system 300 in FIG. 3, may utilize data inputs 400 to determine the number of people at a location and manage movements of client device users at that location. Data inputs 400 include video camera data 402, motion sensor data 404, radio frequency identification reader data 406, navigation data 408, social media web site data 410, electronic task list data 412, user profile data 414, and store map and inventory data 416.

Video camera data 402 are video images of one or more people at a location and may be obtained by, for example, a video system component, such as video system component 312 in FIG. 3. Motion sensor data 404 are data corresponding to a presence of one or more people at a location and may be obtained by, for example, a presence detection component, such as presence detection component 314 in FIG. 3. Radio frequency identification reader data 406 are data corresponding to radio frequency identification tags associated with client devices and/or store merchandize and may be obtained by, for example, a tracking system component, such as tracking system component 308 in FIG. 3.

Navigation data 408 are data corresponding to routes to and through a location and may be obtained by, for example, a mapping system component, such as mapping system component 310 in FIG. 3. Social media web site data 410 are information posted by users and other people identifying locations and future locations of the users and other people. Social media web site data 410 may be obtained by, for example, a crowd density estimation component, such as crowd density estimation component 316 in FIG. 3.

Electronic task list data 412 are data in a set of one or more electronic task lists, such as electronic task lists 326 in FIG. 3. User profile data 414 are data in a user profile, such as user profile 320 in FIG. 3. Store map and inventory data 416 are data related to a layout of a store or other location and may include merchandize inventory information of the store. Store map and inventory data 416 may be obtained from the mapping system component, for example.

Figure 5:
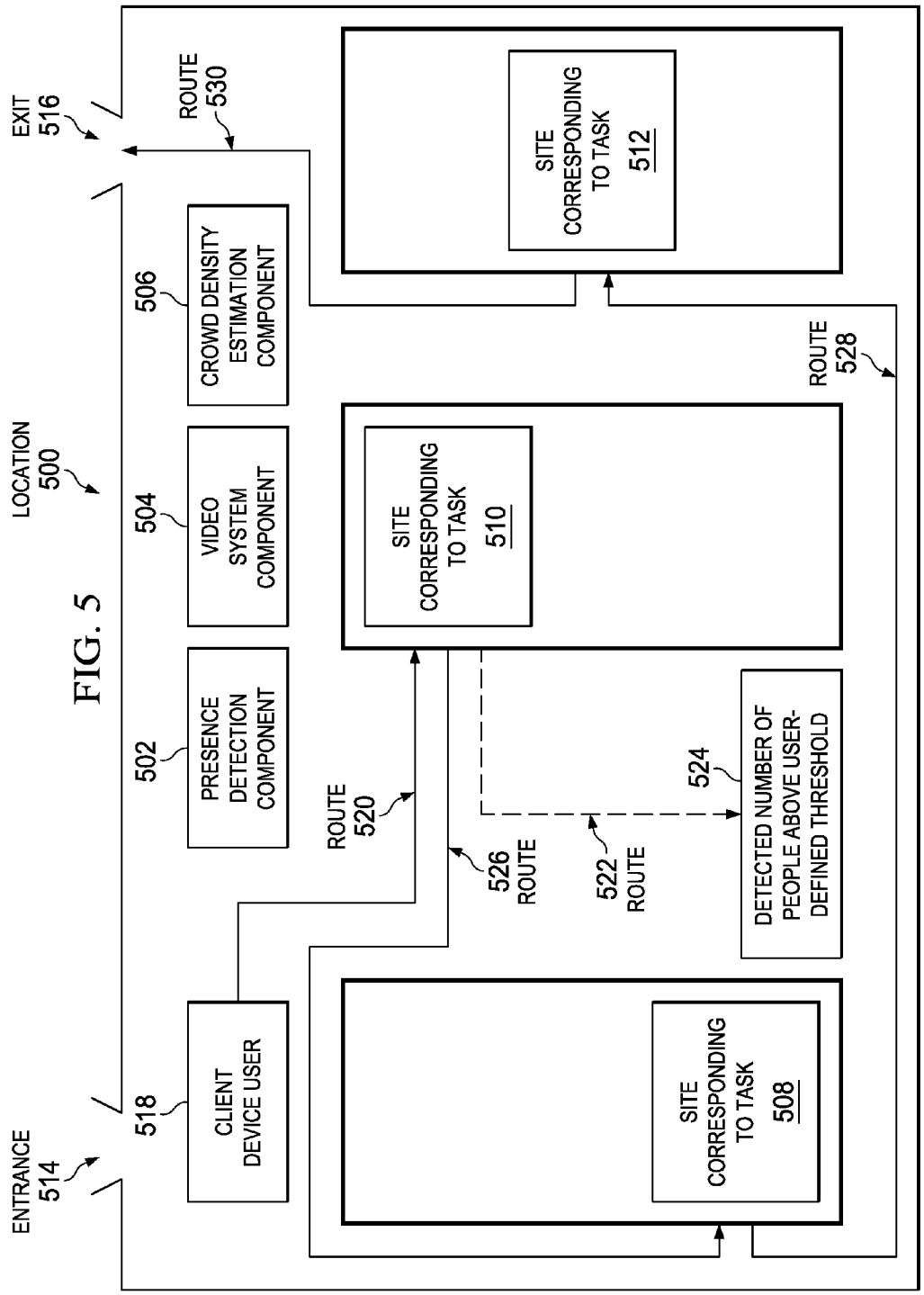
FIG. 5 is a diagram illustrating an example of a location in accordance with an illustrative embodiment.

With reference now to FIG. 5, a diagram illustrating an example of a location is depicted in accordance with an illustrative embodiment. Location 500 may be, for example, a store, an amusement park, a building, et cetera. Location 500 includes presence detection component 502, video system component 504, and crowd density estimation component 506, such as presence detection component 314, video system component 312, and crowd density estimation component 316 in FIG. 3.

Presence detection component 502 detects the presence of client device user 518 entering location 500 at entrance 514. Presence detection component 502 sends this information to a server in a crowd detection system, such as server device 302 in crowd detection system 300 in FIG. 3. The crowd detection system server utilizes data inputs from video system component 504 and crowd density estimation component 506 to determine the location and number of people in location 500. Using the data obtained from video system component 504 and crowd density estimation component 506, the crowd detection system server routes client device user 518 to site corresponding to task 510 via route 520. Site corresponding to task 510 may be, for example, the site of a task in a list of tasks client device user 518 wants to perform at location 500. The task may be, for example, picking out a box of cereal at 510. The crowd detection system server routes client device user 518 based on the tasks within an electronic tasks list, locations and sites corresponding to the tasks within the electronic tasks list, and estimated current crowd densities at those locations and sites. Moreover, the crowd detection system server may estimate future crowd densities at currently crowded locations and sites corresponding to the tasks within the electronic tasks list based on determined historical crowd density patterns and reroute client device user 518 accordingly.

When client device user 518 leaves site corresponding to task 510, the crowd detection system server routes client device user 518 to site corresponding to task 508 via route 526. The task at 508 may be, for example, picking out a carton of eggs. The crowd detection system server does not utilize route 522 because of detected number of people above user-defined threshold 524. Detected number of people above user-defined threshold 524 may be, for example, a user-defined crowd threshold level in user-defined crowd threshold levels 328 in FIG. 3 or may be a default crowd threshold level.

When client device user 518 leaves site corresponding to task 508, the crowd detection system server routes client device user 518 to site corresponding to task 512 via route 528. The task at 512 may be, for example, checking out. The crowd detection system server may route client device user 518 to a check out station with the fewest number of people standing in line at 512. Afterward, the crowd detection system server routes client device user 518 to exit 516 via route 530.

Figure 6B:
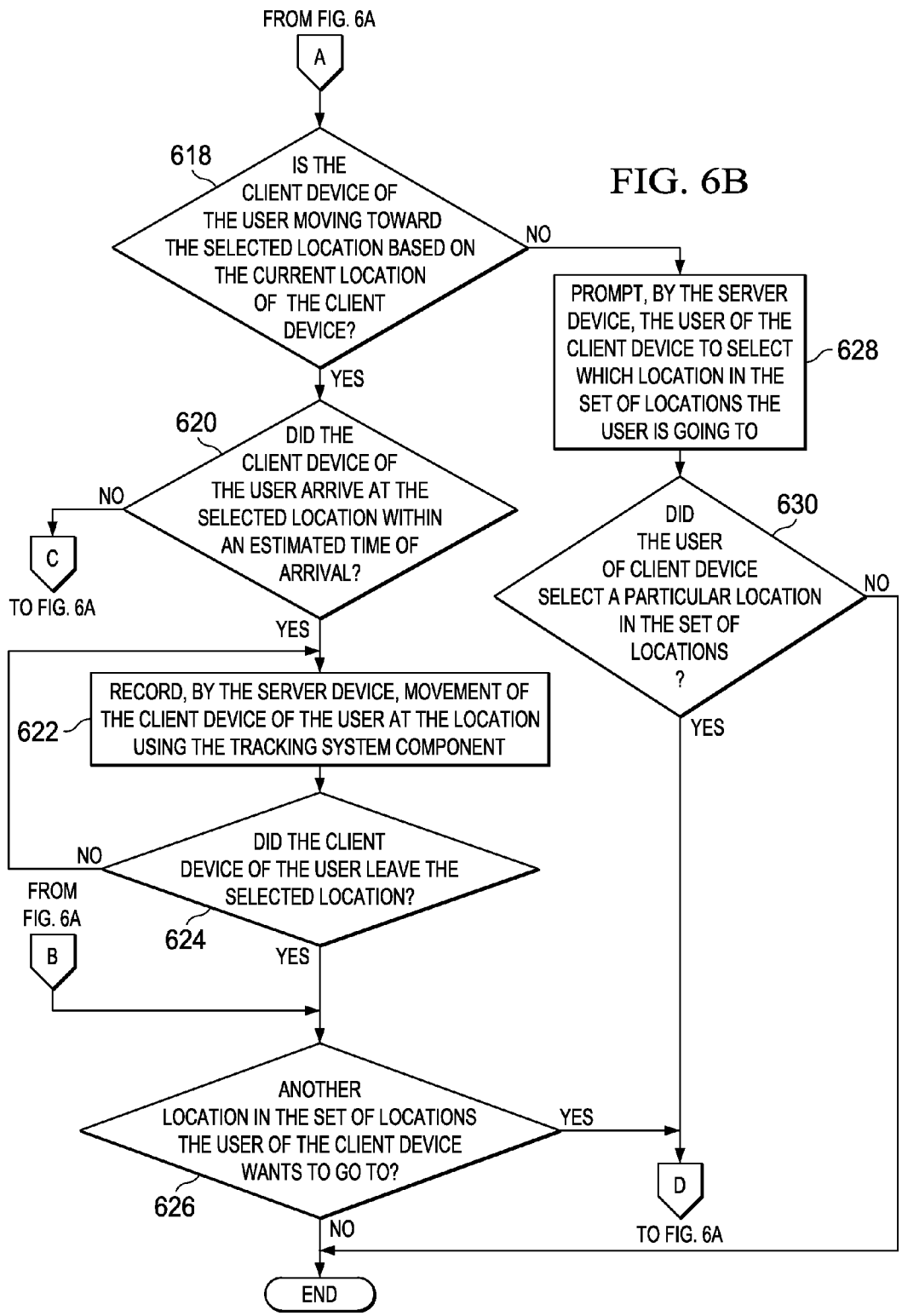

With reference now to FIG. 6A and FIG. 6B, a flowchart illustrating a process for detecting a crowd at a location is shown in accordance with an illustrative embodiment. The process shown in FIGS. 6A and 6B may be implemented in a server device, such as, for example, server device 302 in FIG. 3. In addition, the server device may be implemented in a data processing system, such as data processing system 200 in FIG. 2.

The process begins when the server device receives a profile associated with a user of a client device, such as user profile 320 in FIG. 3 (step 602). The client device may be, for example, client device 304 in FIG. 3. The server device may store the user profile in a user profile database, such as user profile database 306 in FIG. 3.

After receiving the profile in step 602, the server device determines a set of one or more locations the user of the client device wants to go to based on data within the profile associated with the user (step 604). The set of one or more locations the user of the client device wants to go to may be, for example, location 500 in FIG. 5. The data in the user profile that the server device uses to determine the set of location may be, for example, preferences, electronic calendar entries, electronic task lists, and/or history data associated with the user, such as data in user preferences 322, electronic calendar entries 324, electronic task lists 326, and history data 330 in FIG. 3.

In addition, the server device selects a location in the set of locations the user of the client device wants to go to based on the data within the profile associated with the user (step 606). Subsequent to selecting the location in step 606, the server device monitors a set of one or more data inputs to determine a number of people currently at the selected location (step 608). The set of data inputs may be, for example, data inputs 400 in FIG. 4.

Further, the server device makes a determination as to whether the number of people currently at the selected location is greater than a user-defined threshold level of people for the location (step 610). The user-defined threshold level of people for the location may be, for example, a user-defined crowd threshold level in user-defined crowd threshold levels 328 in FIG. 3. If the server device determines that the number of people currently at the selected location is greater than the user-defined threshold level of people for the location, yes output of step 610, then the process proceeds to step 626. If the server device determines that the number of people currently at the selected location is not greater than the user-defined threshold level of people for the location, no output of step 610, then the server device maps a route to the location using a mapping system component (step 612). The mapping system component may be, for example, mapping system component 310 in FIG. 3.

Furthermore, the server device sends the mapped route to the location to the client device of the user (step 614). The server device also monitors a current location of the client device of the user using a tracking system component (step 616). The tracking system component may be, for example, tracking system component 308 in FIG. 3.

Moreover, the server device makes a determination as to whether the client device of the user is moving toward the selected location based on the current location of the client device (step 618). If the server device determines that the client device of the user is moving toward the selected location based on the current location of the client device, yes output of step 618, then the server device makes a determination as to whether the client device of the user arrived at the selected location within an estimated time of arrival (step 620). If the server device determines that the client device of the user did not arrive at the selected location within the estimated time of arrival, no output of step 620, then the process returns to step 616 where the server device monitors the current location of the client device of the user. If the server device determines that the client device of the user did arrive at the selected location within the estimated time of arrival, yes output of step 620, then the server device records movement of the client device of the user at the location using the tracking system component (step 622).

In addition, the server device makes a determination as to whether the client device of the user left the selected location based on data obtained from the tracking system component (step 624). If the server determines that the client device of the user did not leave the selected location based on the data obtained from the tracking system component, no output of step 624, then the process returns to step 622 where the server device continues to record the movement of the client device of the user at the location. If the server determines that the client device of the user did leave the selected location based on the data obtained from the tracking system component, yes output of step 624, then the server device makes a determination as to whether another location exists in the set of locations that the user of the client device wants to go to (step 626).

If the server device determines that another location does exist in the set of locations that the user of the client device wants to go to, yes output of step 626, then the process returns to step 606 where the server device selects another location in the set of locations based on the data within the profile associated with the user. If the server device determines that another location does not exist in the set of locations that the user of the client device wants to go to, no output of step 626, then the process terminates thereafter.

Returning again the step 618, if the server device determines that the client device of the user is not moving toward the selected location based on the current location of the client device, no output of step 618, then the server device prompts the user of the client device to select which location in the set of locations the user is going to (step 628). Afterward, the server device makes a determination as to whether the user of client device selected a particular location in the set of locations (step 630). If the server device determines that the user of client device did select a particular location in the set of locations, yes output of step 630, then the process returns to step 606 where the server device selects that particular location in the set of locations based on the user's selection. If the server device determines that the user of client device did not select a particular location in the set of locations, no output of step 630, then the process terminates thereafter.

With reference now to FIG. 7A and FIG. 7B, a flowchart illustrating a process for detecting a crowd at a site corresponding to a task at a location is shown in accordance with an illustrative embodiment. The process shown in FIGS. 7A and 7B may be implemented in a server device, such as, for example, server device 302 in FIG. 3. In addition, the server device may be implemented in a data processing system, such as data processing system 200 in FIG. 2.

The process begins when the server device detects a presence of a client device of a user at a location in a list of locations the user wants to go to to perform a set of tasks at each location (step 702). The server device may use, for example, a presence detection component, such as presence detection component 502 at location 500 in FIG. 5, to detect the presence of the client device of the user at the location. In addition, the server device retrieves the set of tasks the user of the client device wants to perform at the location from a profile associated with the user (step 704). The profile associated with the user may be, for example, user profile 320 in FIG. 3.

Subsequent to retrieving the set of tasks the user of the client device wants to perform at the location in step 704, the server device selects a task in the set of tasks the user of the client device wants to perform at the location based on data within the profile associated with the user (step 706). The data in the user profile that the server device uses to determine the set of tasks to be performed at the location by the user may be, for example, preferences, electronic task lists, and/or history data associated with the user, such as data in user preferences 322, electronic task lists 326, and history data 330 in FIG. 3. In addition, the server device monitors a set of data inputs to determine a number of people currently at a site corresponding to the task (step 708). The set of data inputs may be, for example, data inputs 400 in FIG. 4. The site corresponding to the task may be, for example, site corresponding to task 508 in FIG. 5.

Further, the server device makes a determination as to whether the number of people currently at the site corresponding to the task is greater than a user-defined threshold level of people for the site (step 710). The user-defined threshold level of people for the site may be, for example, a user-defined crowd threshold level in user-defined crowd threshold levels 328 in FIG. 3. If the server device determines that the number of people currently at the site corresponding to the task is greater than the user-defined threshold level of people for the site, yes output of step 710, then the process proceeds to step 726. If the server device determines that the number of people currently at the site corresponding to the task is not greater than the user-defined threshold level of people for the site, no output of step 610, then the server device maps a route to the site corresponding to the task using a mapping system component (step 712). The mapping system component may be, for example, mapping system component 310 in FIG. 3. Moreover, the server device may utilize a map of the location, such as store map and inventory data 416 in FIG. 4, to map the route to the site corresponding to the task.

Furthermore, the server device sends the mapped route to the site corresponding to the task to the client device of the user (step 714). The server device also monitors a current location of the client device of the user using a tracking system component (step 716). The tracking system component may be, for example, tracking system component 308 in FIG. 3.

Moreover, the server device makes a determination as to whether the client device of the user is moving toward the site corresponding to the task based on the current location of the client device (step 718). If the server device determines that the client device of the user is moving toward the site corresponding to the task based on the current location of the client device, yes output of step 718, then the server device makes a determination as to whether the client device of the user arrived at the site corresponding to the task within an estimated time of arrival (step 720). If the server device determines that the client device of the user did not arrive at the site corresponding to the task within the estimated time of arrival, no output of step 720, then the process returns to step 716 where the server device monitors the current location of the client device of the user. If the server device determines that the client device of the user did arrive at the site corresponding to the task within the estimated time of arrival, yes output of step 720, then the server device records activity of the user of the client device at the site corresponding to the task using a video system component (step 722). The video system component may be, for example, video system component 504 in FIG. 5.

In addition, the server device makes a determination as to whether the client device of the user left the site corresponding to the task (step 724). If the server determines that the client device of the user did not leave the site corresponding to the task based on the data obtained from the tracking system component, no output of step 724, then the process returns to step 722 where the server device continues to record the activity of the user of the client device at the site corresponding to the task. If the server determines that the client device of the user did leave the site corresponding to the task based on the data obtained from the tracking system component, yes output of step 724, then the server device makes a determination as to whether another task exists in the set of tasks associated with the user of the client device (step 726).

If the server device determines that another task does exist in the set of tasks that the user of the client device wants to perform, yes output of step 726, then the process returns to step 706 where the server device selects another task in the set of tasks based on the data within the profile associated with the user. If the server device determines that another task does not exist in the set of tasks that the user of the client device wants to perform, no output of step 726, then the process terminates thereafter.

Returning again the step 718, if the server device determines that the client device of the user is not moving toward the site corresponding to the task based on the current location of the client device, no output of step 718, then the server device prompts the user of the client device to select which task in the set of tasks the user wants to perform (step 728). Afterward, the server device makes a determination as to whether the user of client device selected a particular task in the set of tasks (step 730). If the server device determines that the user of client device did select a particular task in the set of tasks, yes output of step 730, then the process returns to step 706 where the server device selects that particular task in the set of tasks based on the user's selection. If the server device determines that the user of client device did not select a particular task in the set of tasks, no output of step 730, then the process terminates thereafter.

Figure 8B:
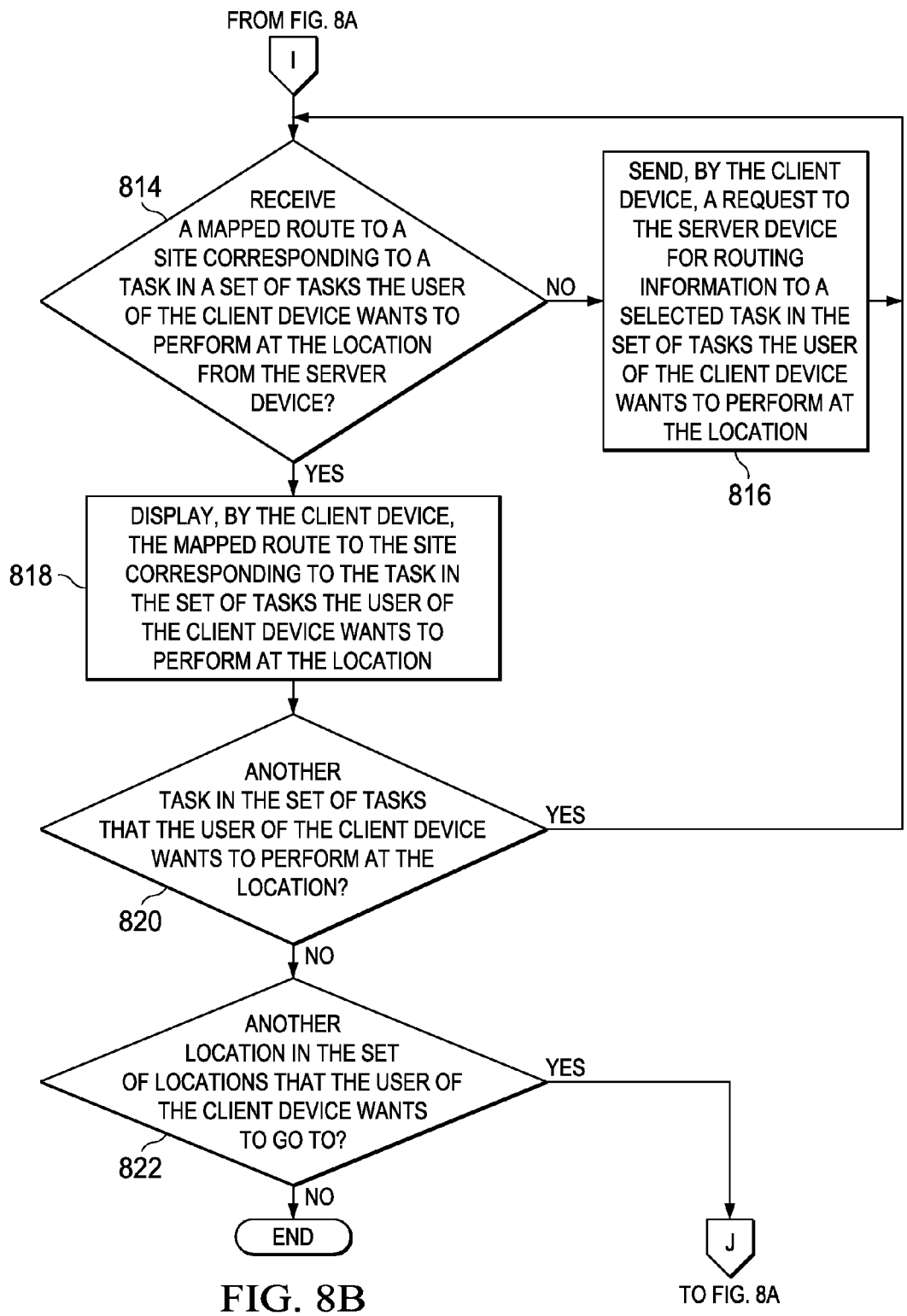

With reference now to FIG. 8A and FIG. 8B, a flowchart illustrating a process for a client device is shown in accordance with an illustrative embodiment. The process shown in FIGS. 8A and 8B may be implemented in a client device, such as, for example, client device 304 in FIG. 3. In addition, the client device may be implemented in a data processing system, such as data processing system 200 in FIG. 2.

The process begins when the client device sends a profile associated with a user of the client device to a server device (step 802). The profile associated with the user may be, for example, user profile 320 in FIG. 3. The server device may be, for example, server device 302 in FIG. 3.

Subsequently, the client device makes a determination as to whether the client device received a mapped route to a location in a set of locations the user of the client device wants to go to from the server device (step 804). The location may be, for example, location 500 in FIG. 5. If the client device determines that the client device did not receive a mapped route to a location in a set of locations the user of the client device wants to go to from the server device, no output of step 804, then the client device sends a request to the server device for routing information to a selected location in the set of locations the user of the client device wants to go to (step 806) and the process returns to step 804 thereafter. If the client device determines that the client device did receive a mapped route to a location in a set of locations the user of the client device wants to go to from the server device, yes output of step 804, then the client device displays the mapped route to the location in the set of locations the user of the client device wants to go to (step 808). The client device may display the mapped route to the location in a display device, such as display 214 in FIG. 2.

In addition, the client device makes a determination as to whether the client device received a prompt from the server device to select a location in the set of locations the user of the client device wants to go to (step 810). If the client device determines that the client device did receive a prompt from the server device to select a location in the set of locations the user of the client device wants to go to, yes output of step 810, then the client device sends a selection of a particular location in the set of locations the user of the client device wants to go to (step 812) and the process returns to step 804 thereafter. If the client device determines that the client device did not receive a prompt from the server device to select a location in the set of locations the user of the client device wants to go to, no output of step 810, then the client device makes a determination as to whether the client device received a mapped route to a site corresponding to a task in a set of tasks the user of the client device wants to perform at the location from the server device (step 814). The site corresponding to the task may be, for example, site corresponding to task 508 in FIG. 5.

If the client device determines that the client device did not receive a mapped route to a site corresponding to a task in a set of tasks the user of the client device wants to perform at the location from the server device, no output of step 814, then the client device sends a request to the server device for routing information to a selected task in the set of tasks the user of the client device wants to perform at the location (step 816) and the process returns to step 814 thereafter. If the client device determines that the client device did receive a mapped route to a site corresponding to a task in a set of tasks the user of the client device wants to perform at the location from the server device, yes output of step 814, then the client device displays the mapped route to the site corresponding to the task in the set of tasks the user of the client device wants to perform at the location (step 818).

Further, the client device makes a determination as to whether another task exists in the set of tasks that the user of the client device wants to perform at the location (step 820). If the client device determines that another task does exist in the set of tasks that the user of the client device wants to perform at the location, yes output of step 820, then the process returns to step 814. If the client device determines that another task does not exist in the set of tasks that the user of the client device wants to perform at the location, no output of step 820, then the client device makes a determination as to whether another location exists in the set of locations that the user of the client device wants to go to (step 822). If the client device determines that another location does exist in the set of locations that the user of the client device wants to go to, yes output of step 822, then the process returns to step 804. If the client device determines that another location does not exist in the set of locations that the user of the client device wants to go to, no output of step 822, then the process terminates thereafter.

Thus, illustrative embodiments provide a method, computer system, and computer program product for managing movements of a client device user based on crowd detection using a plurality of data inputs. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting crowds, the method comprising:
   selecting, by a computer device, a location in a set of locations a user of a client device wants to go to based on data within a profile associated with the user;
   monitoring, by the computer device, a set of data inputs to determine a number of people currently at the selected location;

responsive to the computer device determining that the number of people currently at the selected location is not greater than a user-defined threshold level of people for the selected location, sending, by the computer device, a mapped route to the selected location to the client device of the user;

selecting, by the computer device, a task in a set of tasks the user of the client device wants to perform at the selected location based on the data within the profile associated with the user;

monitoring, by the computer device, the set of data inputs to determine a number of people currently at a site within the selected location corresponding to the selected task in the set of tasks;

responsive to the computer device determining that the number of people currently at the site within the selected location corresponding to the selected task in the set of tasks is not greater than a user-defined threshold level of people for the site, sending, by the computer device, a mapped route to the site within the selected location corresponding to the selected task in the set of tasks to the client device of the user;

responsive to the computer device determining that the client device of the user arrived at the site within the selected location corresponding to the selected task in the set of tasks within an estimated time of arrival, recording, by the computer device, activity of the user of the client device at the site within the selected location corresponding to the selected task in the set of tasks; and responsive to the computer device determining that the client device of the user left the site within the selected location corresponding to the selected task in the set of tasks, determining, by the computer device, whether another task exists in the set of tasks the user of the client device wants to perform at the selected location.

2. The method of claim 1 further comprising:
   detecting, by the computer device, a presence of the client device of the user at the selected location; and
   retrieving, by the computer device, the set of tasks the user of the client device wants to perform at the selected location from the profile associated with the user.

3. The method of claim 1, wherein the computer device records the activity of the user of the client device at the site within the selected location corresponding to the selected task using a video camera system.

4. The method of claim 1 further comprising:
   recording, by the computer device, movement of the client device of the user at the selected location using a tracking system.

5. The method of claim 1, wherein the computer device estimates future crowd densities at the selected location based on recorded historical crowd density patterns at the selected location.

6. The method of claim 1, wherein the computer device monitors a crowd density at a currently crowded location having greater than the user-defined threshold level of people on a predetermined time interval basis and reroutes the user of the client device based on the monitored crowd density.

7. The method of claim 1, wherein the computer device collects data regarding the user of the client device to determine a behavior pattern of the user at the selected location.

8. The method of claim 1, wherein the set of data inputs includes at least one of video camera data, motion sensor data, radio frequency identification reader data, social media web site data, and location map data.

9. The method of claim 1, wherein the computer device receives tracking data from the client device of the user.

10. The method of claim 1, wherein the client device of the user is one a cellular telephone, a smart phone, a personal digital assistant, a gaming device, or a handheld computer.

\* \* \* \* \*